(12) United States Patent
Li (10) Patent No.: US 8,606,257 B2
(45) Date of Patent: Dec. 10, 2013

(54) APPARATUSES AND METHODS FOR MOBILE CAPABILITY SIGNALING

(75) Inventor: Chi-Fang Li, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/168,642

(22) Filed: Jun. 24, 2011

(65) Prior Publication Data

US 2011/0319069 A1 Dec. 29, 2011

Related U.S. Application Data

(60) Provisional application No. 61/358,629, filed on Jun. 25, 2010.

(51) Int. Cl.
*H04W 4/00* (2009.01)
(52) U.S. Cl.
USPC ............ 455/422.1; 455/550.1; 455/450
(58) Field of Classification Search
USPC ............................ 455/422.1, 450, 550.1
See application file for complete search history.

(56) References Cited

U.S. PATENT DOCUMENTS

| | | | | |
|---|---|---|---|---|
| 2007/0275722 | A1* | 11/2007 | Thorson et al. | 455/436 |
| 2010/0272051 | A1* | 10/2010 | Fu et al. | 370/329 |
| 2010/0312994 | A1* | 12/2010 | McBeath et al. | 712/220 |
| 2011/0035639 | A1* | 2/2011 | Earnshaw et al. | 714/748 |
| 2011/0128919 | A1* | 6/2011 | Kim et al. | 370/329 |
| 2011/0176498 | A1* | 7/2011 | Montojo et al. | 370/329 |
| 2011/0205976 | A1* | 8/2011 | Roessel et al. | 370/329 |
| 2011/0243083 | A1* | 10/2011 | Zhang et al. | 370/329 |

FOREIGN PATENT DOCUMENTS

| | | |
|---|---|---|
| WO | WO 2007/061866 A2 | 5/2007 |
| WO | WO 2010/051209 A1 | 5/2010 |

OTHER PUBLICATIONS

NTT Docomo, Nokia, "Way forward for LTE-A UE categories/capabilities in RAN4", 3GPP TSG-RAN WG4 Ad-hoc Meeting #2010-02, R4-101488, Apr. 12-16, 2010, pp. 1-2.
Panasonic, "Discussion on when UE starts aggregating carriers", 3GPP TSG RAN WG1 Meeting #55bis, R1-090261, XP-002570945, Jan. 12-16, 2009, pp. 1-2.
ZTE, "Discussion on activation and deactivation", 3GPP TSG RAN WG2 #70bis, R2-103719, Jun. 28-Jul. 2, 2010, pp. 1-4.
3GPP TR 36. 814 V9.0.0 (Mar. 2010), 3rd Generation Partnership Project; Technical Specification Group Radio Access Network; Evolved Universal Terrestrial Radio Access (E-UTRA); Further advancements for E-UTRA physical layer aspects (Release 9).
3GPP TS 36. 306 V9.0.0 (Dec. 2009), 3rd Generation Partnership Project; Technical Specification Group Radio Access Network; Evolved Universal Terrestrial Radio Access (E-UTRA) User Equipment (UE) radio access capabilities (Release 9).

(Continued)

*Primary Examiner* — Barry Taylor
(74) *Attorney, Agent, or Firm* — Birch, Stewart, Kolasch & Birch, LLP (57) ABSTRACT

A mobile communications device with a wireless module and a controller module is provided. The wireless module performs wireless transmissions and receptions to and from a service network. The controller module receives a capability enquiry message from the service network via the wireless module, and determines a first capability category indicating carrier aggregation capability of the wireless module in response to the capability enquiry message. Also, the controller module transmits a capability information message comprising the first capability category to the service network via the wireless module.

22 Claims, 5 Drawing Sheets

(56) References Cited

OTHER PUBLICATIONS

3GPP TS 36. 331 V9.0.0 (Sep. 2010), 3rd Generation Partnership Project; Technical Specification Group Radio Access Network; Evolved Universal Terrestial Radio Access (E-UTRA) Radio Resource Control (RRC); Protocol specification (Release 9).
3GPP TS 36.306 V9.1.0 (Mar. 2010); 3rd Generation Partnership Project; Technical Specification Group Radio Access Network; Evolved Universal Terrestrial Radio Access (E-UTRA); User Equipment (UE) radio access capabilities (Release 9); Mar. 2010; 16 pages.
3GPP TS 36.331 V9.2.0 (Mar. 2010); 3rd Generation Partnership Project; Technical Specification Group Radio Access Network; Evolved Universal Terrestrial Radio Access (E-UTRA); Radio Resource Control (RRC); Protocol specification (Release 9); Mar. 2010; 248 pages.
3GPP TS 36.306 V9.2.0 (Jun. 2010): 3rd Generation Partnership Project; Technical Specification Group Radio Access Network; Evolved Universal Terrestrial Radio Access (E-UTRA); User Equipment (UE) radio access capabilities (Release 9), XP050441907; pp. 1-16.
3GPP TSG RAN WG1 Meeting 55BIS, Ljubliana, Slovenia, Panasonic: "R1-090261-Discussion on when UE starts aggregating carriers", vol. R1-090261, No. 55BIS, (Jan. 12, 2009), XP-002570945; pp. 1-2.
3GPP TSG RAN WG2 #70bis, Stockholm, Sweden (Jun. 22, 2010); ZTE: "Discussion on activation and deactivation"; R2-103719; pp. 1-4.
3GPP TSG-RAN WG4 Ad-hoc Meeting #2010-02; NTT Docomo et al.: "Way forward for LTE-A UE categories/capabilities in RAN4"; R4-101488, vol. RAN WG4, No. Dublin; (Apr. 20, 2010), XP050427625; pp. 1-2.
3GPP TSG RAN WG1 Meeting #61bis, Dresden, Germany, Jun. 28-Jul. 2, 2010; "Proposal for UE Categories and Capabilities"; R1-103459; pp. 1-3.

* cited by examiner

APPARATUSES AND METHODS FOR MOBILE CAPABILITY SIGNALING

CROSS REFERENCE TO RELATED APPLICATIONS

This Application claims priority of U.S. Provisional Application No. 61/358,629, filed on Jun. 25, 2010, and the entirety of which is incorporated by reference herein.

BACKGROUND OF THE INVENTION

1. Field of the Invention

The invention generally relates to mobile capability signaling, and more particularly, to apparatuses and methods for reporting mobile capability concerning the features of carrier aggregation.

2. Description of the Related Art

In a typical mobile communications environment, a user equipment (UE), including a mobile telephone (also known as a cellular or cell phone), a laptop computer with wireless communications capability, or a personal digital assistant (PDA) etc., may communicate voice and/or data signals with one or more service network. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others. Take the LTE technology in compliance with the 3GPP TS 36.331 specification (referred to herein as the TS 36.331 specification) as an example. A UE supports only a single carrier transmission and reception, and the capability of the UE is signaled to the network side by a "ue-Category" parameter which contains 5 categories standing for 5 different sets of combined downlink/uplink data rates, Hybrid Automatic Repeat reQuest (HARQ) processing capability, and multi-antenna capability, etc.

In order to meet users' demand for higher data rate in wireless communications, support of wider transmission bandwidths is required and the so-called Carrier Aggregation (CA) technique has been proposed to allow expansion of effective bandwidths delivered to a UE through concurrent utilization of radio resources across multiple carriers. The CA technique is most useful when it is difficult to derive a contiguous and extra wide bandwidth. With the CA technique, more than 2 frequency bands may be aggregated to form a larger transmission/receive bandwidth. Each of the aggregated frequency channels is generally referred to as a Component Carrier (CC), which may be taken as a component of the aggregated bandwidth. With the advancement from single-carrier transceiving to multiple-carrier transceiving, the conventional way of mobile capability signaling for single-carrier capability is no longer adequate. Thus, it is desirable to provide a new way of mobile capability signaling for a UE to report its carrier aggregation capability.

BRIEF SUMMARY OF THE INVENTION

Accordingly, embodiments of the invention provide apparatuses and methods for mobile capability signaling. In one aspect of the invention, a mobile communications device comprising a wireless module and a controller module is provided. The wireless module performs wireless transmissions and receptions to and from a service network. The controller module receives a capability enquiry message from the service network via the wireless module, and determines a first capability category indicating carrier aggregation capability of the wireless module in response to the capability enquiry message. Also, the controller module transmits a capability information message comprising the first capability category to the service network via the wireless module.

In another aspect of the invention, a method for mobile capability signaling by a mobile communication device is provided. The method comprises the steps of receiving a capability enquiry message from a service network, determining a first capability category indicating carrier aggregation capability of the wireless module in response to the capability enquiry message, and transmitting a capability information message comprising the first capability category to the service network.

In yet another aspect of the invention, a mobile communications device comprising a wireless module and a controller module is provided. The wireless module performs wireless transmissions and receptions to and from a service network. The controller module receives a capability enquiry message from the service network via the wireless module, and determines a maximum number of carriers supported by the wireless module and capability category information for the carriers in response to the capability enquiry message. Also, the controller module reports, via the wireless module, the maximum number of supported carriers and the capability category information to the service network by at least a capability information message.

In still another aspect of the invention, a method for mobile capability signaling by a mobile communication device is provided. The method comprises the steps of receiving a capability enquiry message from the service network, determining a maximum number of carriers supported by the wireless module and capability category information for the carriers in response to the capability enquiry message, and reporting the maximum number of supported carriers and the capability category information to the service network by at least a capability information message.

Other aspects and features of the present invention will become apparent to those with ordinarily skill in the art upon review of the following descriptions of specific embodiments of apparatuses and methods for mobile capability signaling.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Figure 1:
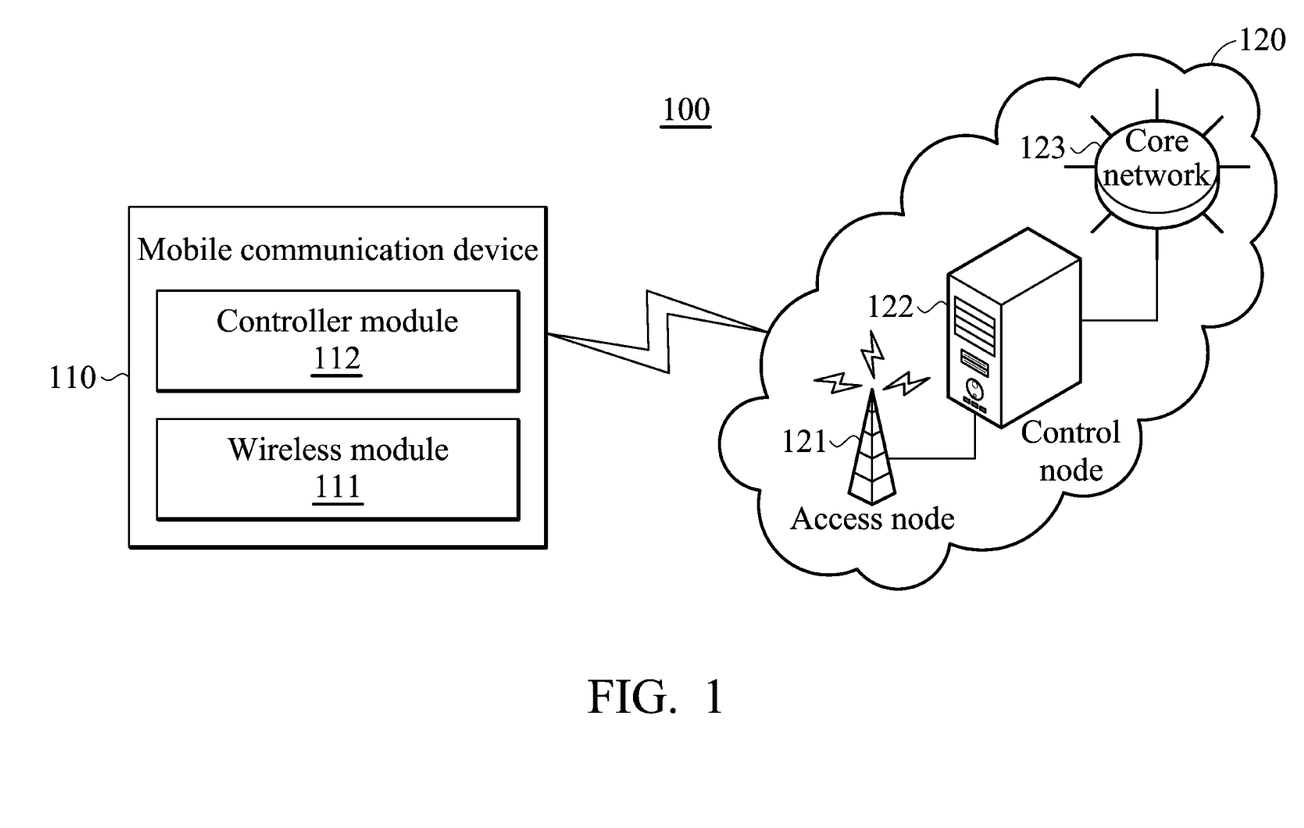
FIG. 1 is a block diagram illustrating a mobile communication environment according to an embodiment of the invention.

FIG. 1 is a block diagram illustrating a mobile communication environment according to an embodiment of the invention. In the mobile communications environment 100, the mobile communication device 110 is wirelessly connected to the service network 120 for obtaining wireless services. The service network 120 comprises at least one access node 121 for performing wireless transmissions and receptions to and from the mobile communication device 110, and a control node 122 for controlling the operation of the at least one access node 121, wherein the control node 122 is further connected to a core network 123. The mobile communication device 110 comprises a wireless module 111 for performing the functionality of wireless transmissions and receptions to and from the service network 120. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the RAT in use. Also, the mobile communication device 110 comprises a controller module 112 for controlling the operation of the wireless module 111 and other functional components, such as a display unit and/or keypad serving as the MMI (man-machine interface), a storage unit storing the program codes of applications or communication protocols, or others.

Figure 2:
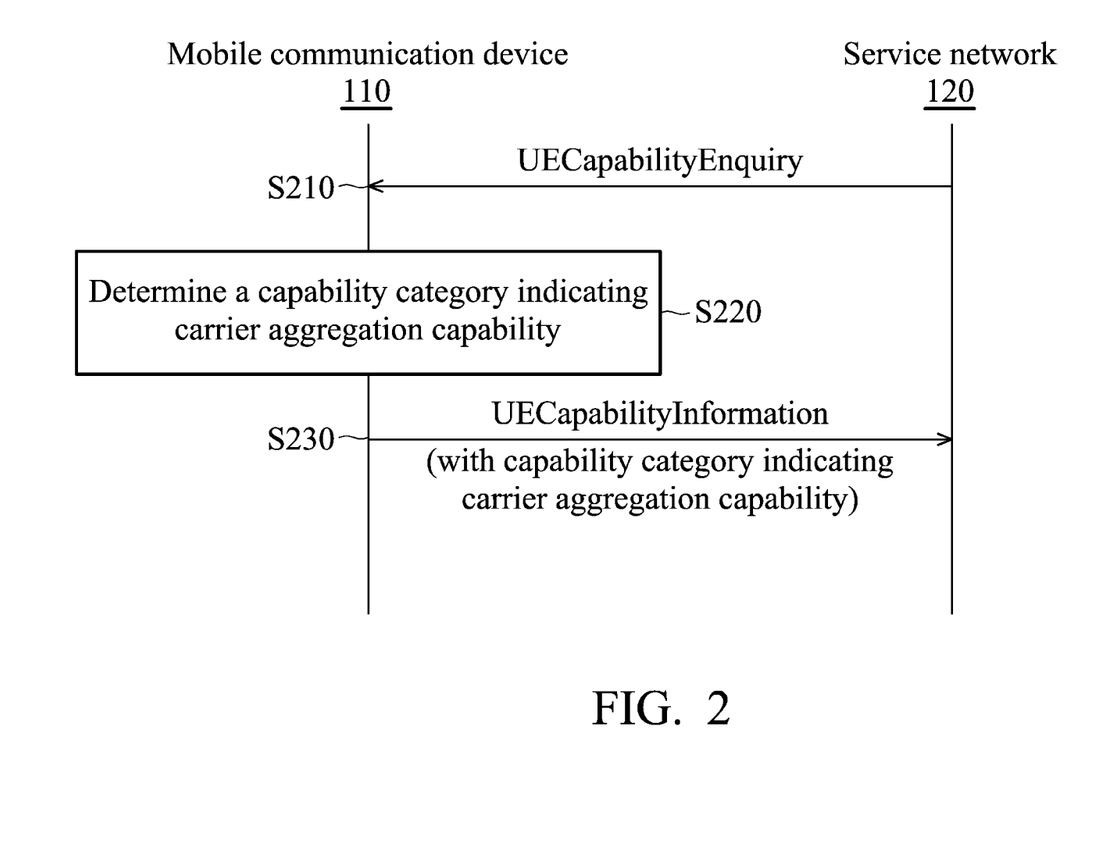
FIG. 2 is a message sequence chart illustrating a UE capability transfer procedure according to an embodiment of the invention.

To be more specific, the controller module 112 controls the wireless module 111 to perform a UE capability transfer procedure for mobile capability signaling. FIG. 2 is a message sequence chart illustrating a UE capability transfer procedure according to an embodiment of the invention. In this embodiment, the service network 120 is an LTE-Advanced system, and the communications between the mobile communication device 110 and the service network 120 are in compliance with the 3GPP TS36.331 specification, v9.0.0 (referred to herein as the TS36.331 specification), 3GPP TS36.306 specification, v9.0.0 (referred to herein as the TS36.306 specification), 3GPP TS36.814 specification, v9.0.0 (referred to herein as the TS36.814 specification), and/or other 3GPP specifications for the LTE-Advanced technology. Specifically, the mobile communication device 110 supports multi-carrier transceiving, i.e., the carrier aggregation technique. After being powered on, the mobile communication device 110 connects to the service network 120 for obtaining wireless services therefrom. Later, when the service network 120 needs the UE radio access capability information of the mobile communication device 110, it initiates the UE capability transfer procedure by transmitting a UECapabilityEnquiry message to the mobile communication device 110 (step S210). In response to the UECapabilityEnquiry message, the mobile communication device 110 determines a capability category indicating its carrier aggregation capability (step S220). After that, the mobile communication device 110 transmits a UECapabilityInformation message comprising the capability category to the service network 120 (step S230). Specifically, the capability category may refer to a "ue-Category" parameter included in an UE-EUTRA-Capability" Information Element (IE). Unlike the conventional "ue-Category" parameter used in the LTE technology, the "ue-Category" parameter in this invention may contain 5 or more categories standing for 5 or more different combined downlink/uplink data rates, Hybrid Automatic Repeat reQuest (HARQ) processing capability, multi-antenna capability, and most importantly, carrier aggregation capability, supported by the mobile communication device 110. The carrier aggregation capability may indicate any combination of a maximum number of supported carriers, a first indicator for indicating whether the supported carriers are in the same frequency band, a second indicator for indicating whether the supported carriers are adjacent carriers, and a third indicator for indicating whether aggregation of the supported carriers may be processed by a single radio frequency process or a single frequency processing unit.

In one embodiment, the capability category may be determined according to a mapping table which stores the UE capability information for each category. Below is an example of such mapping table.

TABLE 1

| UE category | Maximum number of DL-SCH transport block bits received within a TTI | Maximum number of bits of DL-SCH transport block received within a TTI | Total number of soft channel bits | Maximum number of supported layers for spatial multiplexing in DL | Maximum number of supported carriers |
|---|---|---|---|---|---|
| Category 1 | 10296 | 10296 | 250368 | 1 | 1 |
| Category 2 | 51024 | 51024 | 1237248 | 2 | 1 |
| Category 3 | 102048 | 75376 | 1237248 | 3 | 1 |
| Category 4 | 150752 | 75376 | 1827072 | 4 | 1 |
| Category 5 | 299552 | 149776 | 3667200 | 5 | 1 |
| Category 6 | 10296 | 10296 | 250368 | 1 | 2 |
| Category 7 | 51024 | 51024 | 1237248 | 2 | 2 |
| Category 8 | 102048 | 75376 | 1237248 | 3 | 2 |
| Category 9 | 150752 | 75376 | 1827072 | 4 | 2 |
| Category 10 | 299552 | 149776 | 3667200 | 5 | 2 |

In Table 1, category 1 to category 5 are reserved for the LTE-Advanced legacy systems, such as the LTE systems, WCDMA systems, etc., which support only a single carrier, while category 6 to category 10 are defined for the LTE-Advanced systems which support multiple carriers (i.e., the mobile communication device 110 with one of the categories 6 to 10 may operate 2 carriers in the same time). Specifically, the downlink/uplink data rates supported by the mobile communication device 110 may be determined according to the maximum number of DL-SCH transport block bits received within a TTI and the maximum number of bits of a DL-SCH transport block received within a TTI in Table 1. HARQ processing capability may be determined according to the total number of soft channel bits in Table 1, and multi-antenna capability may be determined according to the maximum number of supported layers for spatial multiplexing in DL in Table 1. Alternatively, the mapping table may further store the first indicator, the second indicator, and the third indicator of the carrier aggregation capability for each category, as shown in the following.

system or other legacy system of the LTE-Advanced system, the mobile communication device 110 may determine another capability category for indicating single-carrier capability, e.g., one of the category 1 to category 5 in Table 1 or Table 2. Subsequently, the mobile communication device 110 may include the capability category for single carrier capability, instead of the capability category for carrier aggregation capability, in the UECapabilityInformation message; or the mobile communication device 110 may include the capability category for single carrier capability, along with the capability category for carrier aggregation capability, in the UECapabilityInformation message.

Figure 3:
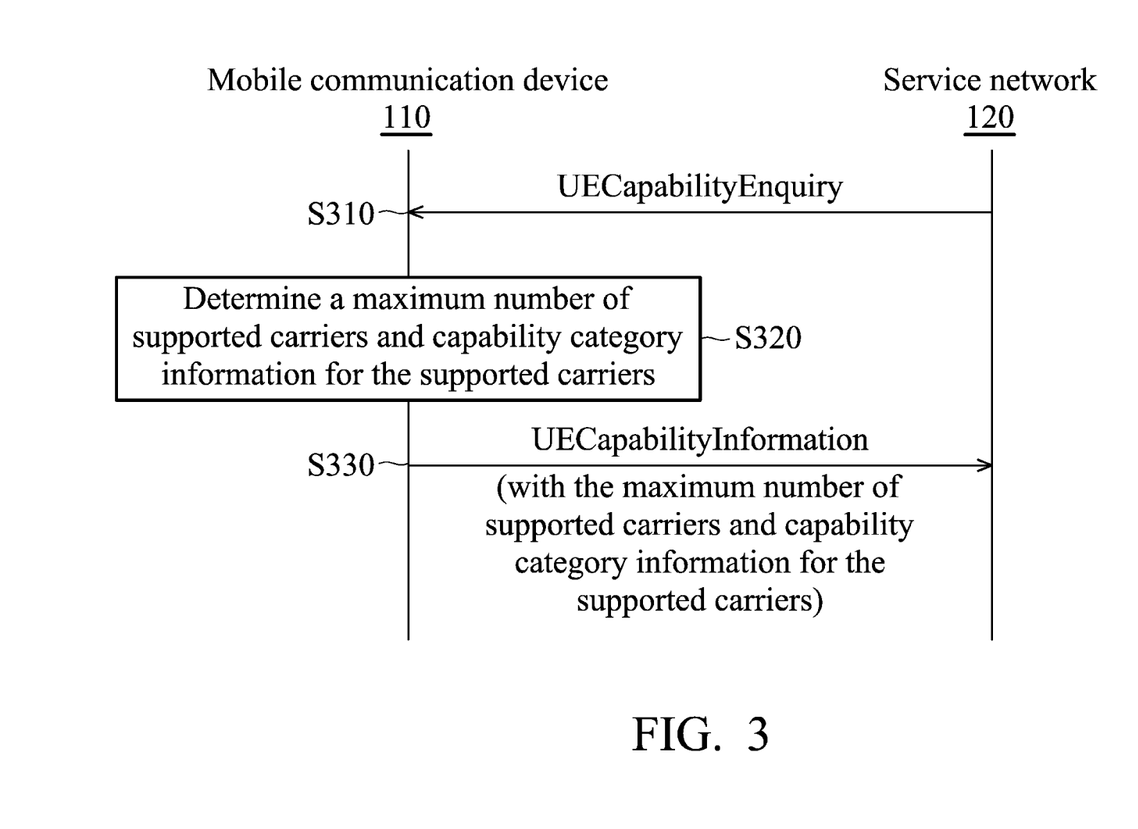
FIG. 3 is a message sequence chart illustrating a UE capability transfer procedure according to another embodiment of the invention.

FIG. 3 is a message sequence chart illustrating a UE capability transfer procedure according to another embodiment of the invention. Similar to FIG. 2, the service network 120 is an LTE-Advanced system, and the communications between the mobile communication device 110 and the service network 120 are in compliance with the TS36.331 specification, the TS36.306 specification, the TS36.814 specification, and/or other 3GPP specifications for the LTE-Advanced technology.

TABLE 2

| UE category | Maximum number of DL-SCH transport block bits received within a TTI | Maximum number of bits of a DL-SCH transport block received within a TTI | Total number of soft channel bits | Maximum number of supported layers for spatial multiplexing in DL | Maximum number of supported carriers | $1^{st}$ Ind. | $2^{nd}$ Ind. | $3^{rd}$ Ind. |
|---|---|---|---|---|---|---|---|---|
| Category 1 | 10296 | 10296 | 250368 | 1 | 1 | NULL | NULL | NULL |
| Category 2 | 51024 | 51024 | 1237248 | 2 | 1 | NULL | NULL | NULL |
| Category 3 | 102048 | 75376 | 1237248 | 3 | 1 | NULL | NULL | NULL |
| Category 4 | 150752 | 75376 | 1827072 | 4 | 1 | NULL | NULL | NULL |
| Category 5 | 299552 | 149776 | 3667200 | 5 | 1 | NULL | NULL | NULL |
| Category 6 | 10296 | 10296 | 250368 | 1 | 2 | Y | Y | Y |
| Category 7 | 51024 | 51024 | 1237248 | 2 | 2 | Y | Y | Y |
| Category 8 | 102048 | 75376 | 1237248 | 3 | 2 | Y | Y | Y |
| Category 9 | 150752 | 75376 | 1827072 | 4 | 2 | Y | Y | Y |
| Category 10 | 299552 | 149776 | 3667200 | 5 | 2 | Y | Y | Y |
| Category 11 | 10296 | 10296 | 250368 | 1 | 3 | N | N | Y |
| Category 12 | 51024 | 51024 | 1237248 | 2 | 3 | N | N | Y |
| Category 13 | 102048 | 75376 | 1237248 | 3 | 3 | N | N | Y |
| Category 14 | 150752 | 75376 | 1827072 | 4 | 3 | N | N | Y |
| Category 15 | 299552 | 149776 | 3667200 | 5 | 3 | N | N | Y |

In Table 2, category 1 to category 5 are reserved for the LTE-Advanced legacy systems, such as the LTE systems, WCDMA systems, etc., which support only a single carrier, while category 6 to category 10 and category 11 to category 15 are defined for the LTE-Advanced systems which support 2 carriers and 3 carriers, respectively. Particularly, the first indicator indicates whether the supported carriers are in the same frequency band, the second indicator indicates whether the supported carriers are adjacent carriers, and the third indicator indicates whether aggregation of the supported carriers may be processed by a single radio frequency process or a single frequency processing unit, wherein N represents "NO", Y represents "YES", and NULL represents an empty value (i.e., the field should be omitted). Note that, the mobile communication device 110 is also capable of communicating with any legacy system of the LTE-Advanced system. That is, if the UE capability transfer procedure is initiated by an LTE Specifically, the mobile communication device 110 supports multi-carrier transceiving, i.e., the carrier aggregation technique. After being powered on, the mobile communication device 110 connects to the service network 120 for obtaining wireless services therefrom. Later, when the service network 120 needs the UE radio access capability information of the mobile communication device 110, it initiates the UE capability transfer procedure by transmitting a UECapabilityEnquiry message to the mobile communication device 110 (step S310). In response to the UECapabilityEnquiry message, the mobile communication device 110 determines a set of capability parameters, including at least a maximum number of supported carriers and the capability category information for the supported carriers (step S320). After that, the mobile communication device 110 reports the set of capability parameters, including the maximum number of supported carriers and the capability category information, to the service network 120 by at least a UECapabilityInformation message (step S330). In one embodiment, all of the supported carriers may have the same capability, and the capability category information may comprise a single capability category for all of the supported carriers. When receiving the set of capability parameters, the service network 120 may determine that the mobile communication device 110 is capable of a maximum data rate equal to the product of the maximum number of supported carriers and the data rate indicated by the single capability category. In another embodiment, each of the supported carriers may have a respective capability, and the capability category information may comprise a plurality of capability categories respectively corresponding to the supported carriers. That is, the set of capability parameters may comprise the maximum number of supported carriers, capability category for the $1^{st}$ carrier, capability category for the $2^{nd}$ carrier, capability category for the $3^{rd}$ carrier, and so on. When receiving the set of capability parameters, the service network 120 may determine that the mobile communication device 110 is capable of a maximum data rate equal to the sum of the data rates indicated by the plurality of the capability categories. In either embodiment, each capability category may indicate downlink/uplink data rates, HARQ processing capability, and multi-antenna capability for a respective carrier. Reference may be made to Table 1 for an exemplary capability category, excluding the last column of Table 1, or reference may be made to Table 2 for another exemplary capability category, excluding the last 4 columns of Table 2. It is to be understood that, in view of the above-mentioned examples, other variations of the capability category may be contemplated for those skilled in the art, and the invention is not limited thereto.

In the step S320, the mobile communication device 110 may further determine any combination of a first indicator for indicating whether the carriers are in the same frequency band, a second indicator for indicating whether the carriers are adjacent carriers, and a third indicator for indicating whether aggregation of the carriers may be processed by a single radio frequency process or a single frequency processing unit. Accordingly, in the step S330, the set of capability parameters may further comprise the determined combination of the first indicator, the second indicator, and the third indicator, so that the determined combination of the first indicator, the second indicator, and the third indicator may also be reported to the service network 120. In addition, the set of capability parameters may be reported together or separately to the service network 120. In one embodiment, the set of capability parameters may be reported together to the service network 120 by the UECapabilityInformation message, while in another embodiment, the set of capability parameters may be reported separately to the service network 120 by the UECapabilityInformation message and one or more other messages, such as some specific physical layer dedicated messages. Note that, the mobile communication device 110 is also capable of communicating with any legacy system of the LTE-Advanced system. That is, if the UE capability transfer procedure is initiated by an LTE system or other legacy system of the LTE-Advanced system, the mobile communication device 110 may report to the service network 120 with another capability category for indicating single-carrier capability (e.g, one of the category 1 to category 5 in Table 1 or Table 2), instead of the set of capability parameters. Alternatively, the mobile communication device 110 may report to the service network 120 with another capability category for indicating single-carrier capability, along with the set of capability parameters.

Figure 4:
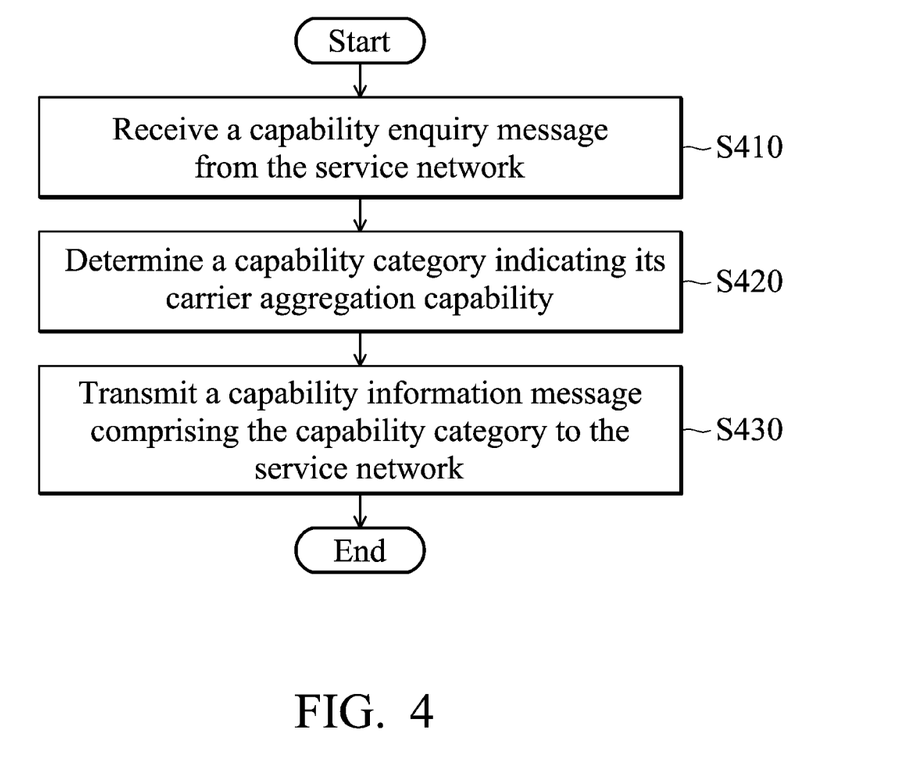
FIG. 4 is a flow chart illustrating the method for mobile capability signaling according to an embodiment of the invention.

FIG. 4 is a flow chart illustrating the method for mobile capability signaling according to an embodiment of the invention. The method may be applied in any mobile communication device which operates in compliance with the TS36.331 specification, the TS36.306 specification, the TS36.814 specification, and/or other 3GPP specifications for the LTE-Advanced technology. Initially, the mobile communication device is connected with a service network which supports at least the LTE-Advanced technology. To begin the method, the mobile communication device first receives a capability enquiry message from the service network (step S410). In this embodiment, the capability enquiry message is a UECapabilityEnquiry message which represents the initiation of a UE capability transfer procedure by the service network. In response to the capability enquiry message, the mobile communication device determines a capability category indicating its carrier aggregation capability (step S420). Subsequently, the mobile communication device transmits a capability information message comprising the capability category to the service network (step S430), and the method ends. Note that, the mobile communication device is also capable of communicating with any legacy system of the LTE-Advanced system. That is, if the UE capability transfer procedure is initiated by an LTE system or other legacy system of the LTE-Advanced system, the mobile communication device may determine another capability category for indicating single-carrier capability, e.g., one of the category 1 to category 5 in Table 1 or Table 2. Subsequently, the mobile communication device may include the capability category for single carrier capability, instead of the capability category for carrier aggregation capability, in the capability information message; or the mobile communication device may include the capability category for single carrier capability, along with the capability category for carrier aggregation capability, in the capability information message.

Specifically, the capability category may refer to a "ue-Category" parameter included in an UE-EUTRA-Capability" IE. Unlike the conventional "ue-Category" parameter used in the LTE technology, the "ue-Category" parameter in this invention may contain 5 or more categories standing for 5 or more different combined downlink/uplink data rates, HARQ processing capability, multi-antenna capability, and most importantly, carrier aggregation capability, supported by the mobile communication device. The carrier aggregation capability may indicate any combination of a maximum number of supported carriers, a first indicator for indicating whether the supported carriers are in the same frequency band, a second indicator for indicating whether the supported carriers are adjacent carriers, and a third indicator for indicating whether aggregation of the supported carriers may be processed by a single radio frequency process or a single frequency processing unit. In one embodiment, the capability category may be determined according to a mapping table which stores the UE capability information for each category. References may be made to Table 1 and Table 2 for examples of such mapping table. It is to be understood that, in view of the above-mentioned examples, other variations of the capability category may be contemplated for those skilled in the art, and the invention is not limited thereto.

Figure 5:
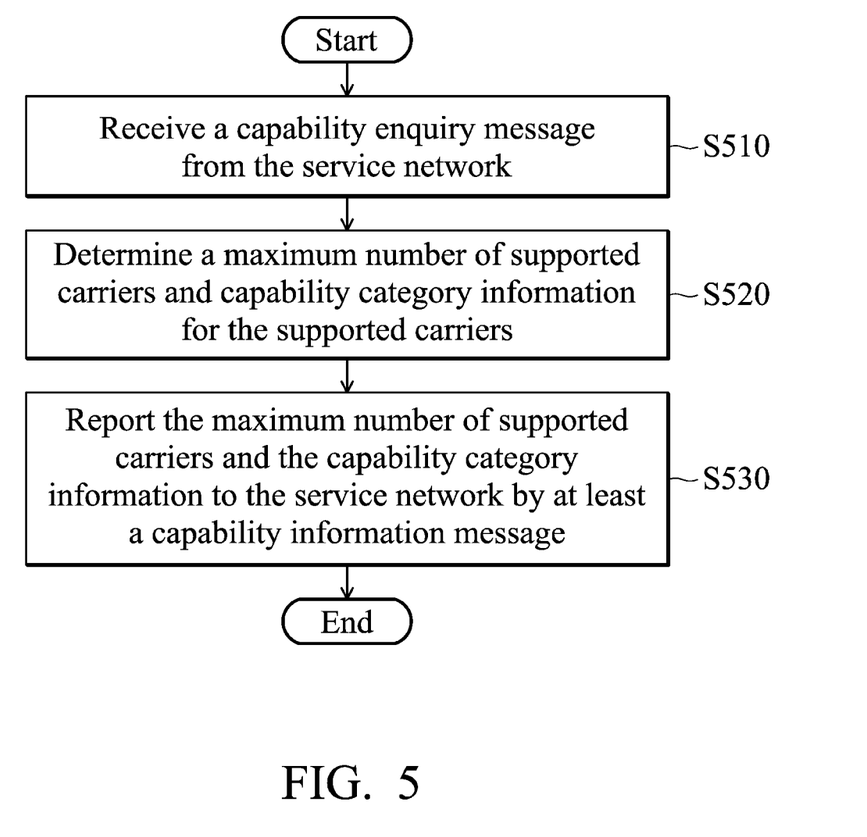
FIG. 5 is a flow chart illustrating the method for mobile capability signaling according to another embodiment of the invention.

FIG. 5 is a flow chart illustrating the method for mobile capability signaling according to another embodiment of the invention. The method may be applied in any mobile communication device which operates in compliance with the TS36.331 specification, the TS36.306 specification, the TS36.814 specification, and/or other 3GPP specifications for the LTE-Advanced technology. Initially, the mobile communication device is connected with a service network which supports at least the LTE-Advanced technology. To begin the method, the mobile communication device first receives a capability enquiry message from the service network (step S510). Specifically, the capability enquiry message may be a UECapabilityEnquiry message which represents the initiation of a UE capability transfer procedure by the service network. In response to the capability enquiry message, the mobile communication device determines a set of capability parameters, including at least a maximum number of supported carriers and capability category information for the supported carriers (step S520). Subsequently, the mobile communication device reports the set of capability parameters, including the maximum number of supported carriers and the capability category information, to the service network by at least a capability information message (step S530), and the method ends. Specifically, the capability information message may be a UECapabilityInformation message. The set of capability parameters may be reported together or separately to the service network. To be more specific, the set of capability parameters may be reported together to the service network by the capability information message, or may be reported separately to the service network by the capability information message and one or more other messages, such as some specific physical layer dedicated messages. Note that, the mobile communication device is also capable of communicating with any legacy system of the LTE-Advanced system. That is, if the service network initiating the UE capability transfer procedure is an LTE system or other legacy system of the LTE-Advanced system, the mobile communication device may report to the service network with another capability category for indicating single-carrier capability (e.g, one of the category 1 to category 5 in Table 1 or Table 2), instead of the set of capability parameters. Alternatively, the mobile communication device may report to the service network with another capability category for indicating single-carrier capability, along with the set of capability parameters.

In one embodiment, all of the supported carriers may have the same capability, and the capability category information may comprise a single capability category for all of the supported carriers. When receiving the set of capability parameters, the service network may determine that the mobile communication device is capable of a maximum data rate equal to the product of the maximum number of supported carriers and the data rate indicated by the single capability category. In another embodiment, each of the supported carriers may have a respective capability, and the capability category information may comprise a plurality of capability categories respectively corresponding to the supported carriers. That is, the set of capability parameters may comprise the maximum number of supported carriers, capability category for the $1^{st}$ carrier, capability category for the $2^{nd}$ carrier, capability category for the $3^{rd}$ carrier, and so on. When receiving the set of capability parameters, the service network may determine that the mobile communication device is capable of a maximum data rate equal to the sum of the data rates indicated by the plurality of the capability categories. In either embodiment, each capability category may indicate downlink/uplink data rates, HARQ processing capability, and multi-antenna capability for a respective carrier. Reference may be made to Table 1 for an exemplary capability category, excluding the last column of Table 1, or reference may be made to Table 2 for another exemplary capability category, excluding the last 4 columns of Table 2. It is to be understood that, in view of the above-mentioned examples, other variations of the capability category may be contemplated for those skilled in the art, and the invention is not limited thereto.

In the step S520, the mobile communication device may further determine any combination of a first indicator for indicating whether the carriers are in the same frequency band, a second indicator for indicating whether the carriers are adjacent carriers, and a third indicator for indicating whether aggregation of the carriers may be processed by a single radio frequency process or a single frequency processing unit. Accordingly, in the step S530, the set of capability parameters may further comprise the determined combination of the first indicator, the second indicator, and the third indicator, so that the determined combination of the first indicator, the second indicator, and the third indicator may also be reported to the service network.

While the invention has been described by way of example and in terms of preferred embodiment, it is to be understood that the invention is not limited thereto. Those who are skilled in this technology can still make various alterations and modifications without departing from the scope and spirit of this invention. For example, the method for mobile capability signaling may be also applied for mobile communication devices and service networks in compliance with any evolutionary technology of the LTE-Advanced technology. Therefore, the scope of the present invention shall be defined and protected by the following claims and their equivalents.

What is claimed is:

1. A mobile communications device, comprising:
  a wireless module performing wireless transmissions and receptions to and from a service network; and
  a controller module receiving a capability enquiry message from the service network via the wireless module, determining a first capability category indicating carrier aggregation capability of the wireless module in response to the capability enquiry message, and transmitting a capability information message comprising the first capability category to the service network via the wireless module,
  wherein the carrier aggregation capability comprises the number of carriers supported by the mobile communication device and the carrier aggregation capability is able to indicate multiple component carriers or indicate a single component carrier.

2. The mobile communications device of claim 1, wherein the first capability category further indicates downlink and uplink data rates, Hybrid Automatic Repeat reQuest (HARQ) processing capability, and multi-antenna capability supported by the wireless module.

3. The mobile communications device of claim 1, wherein the carrier aggregation capability indicates any combination of the following:
  the number of carriers supported by the mobile communication device;
  a first indicator for indicating whether the carriers are in the same frequency band;
  a second indicator for indicating whether the carriers are adjacent carriers; and
  a third indicator for indicating whether aggregation of the carriers is processed by a single radio frequency process or a single frequency processing unit.

4. The mobile communications device of claim 1, wherein the controller module further determines a second capability category indicating single carrier capability of the wireless module in a legacy system of a Long Term Evolution Advanced (LTE-Advanced) system, and the capability information message further comprises the second capability category.

5. The mobile communications device of claim 1, wherein the controller module further determines a second capability category indicating single carrier capability of the wireless module in a legacy system of a Long Term Evolution Advanced (LTE-Advanced) system, and the capability information message comprises the second capability category instead of the first capability category.

6. A method for mobile capability signaling by a mobile communication device, comprising:
   receiving a capability enquiry message from a service network;
   determining a first capability category indicating carrier aggregation capability of the mobile communication device in response to the capability enquiry message, wherein the carrier aggregation capability comprises the number of carriers supported by the mobile communication device and the carrier aggregation capability is able to indicate multiple component carriers or indicate a single component carrier; and
   transmitting a capability information message comprising the first capability category to the service network.

7. The method of claim 6, wherein the first capability category further indicates downlink and uplink data rates, Hybrid Automatic Repeat reQuest (HARQ) processing capability, and multi-antenna capability supported by the mobile communication device.

8. The method of claim 6, wherein the carrier aggregation capability indicates any combination of the following:
   the number of carriers supported by the mobile communication device;
   a first indicator for indicating whether the carriers are in the same frequency band;
   a second indicator for indicating whether the carriers are adjacent carriers; and
   a third indicator for indicating whether aggregation of the carriers is processed by a single radio frequency process or a single frequency processing unit.

9. The method of claim 6, further comprising determining a second capability category indicating single carrier capability of the wireless module in a legacy system of a Long Term Evolution Advanced (LTE-Advanced) system, wherein the capability information message further comprises the second capability category.

10. The method of claim 6, further comprising determining a second capability category indicating single carrier capability of the wireless module in a legacy system of a Long Term Evolution Advanced (LTE-Advanced) system, wherein the capability information message comprises the second capability category instead of the first capability category.

11. A mobile communication device, comprising:
   a wireless module performing wireless transmissions and receptions to and from a service network; and
   a controller module receiving a capability enquiry message from the service network via the wireless module, determining a maximum number of carriers supported by the mobile communication device and capability category information for the carriers in response to the capability enquiry message, and reporting, via the wireless module, the maximum number of supported carriers and the capability category information to the service network by at least a capability information message,
   wherein each of the carriers has the same capability, and the capability category information comprises a single capability category for all of the carriers.

12. The mobile communication device of claim 11, wherein the capability category indicates downlink and uplink data rates, Hybrid Automatic Repeat reQuest (HARQ) processing capability, and multi-antenna capability for all of the carriers supported by the wireless module.

13. The mobile communication device of claim 11, wherein the controller module further determines any combination of the following in response to the capability enquiry message:
   a first indicator for indicating whether the carriers are in the same frequency band;
   a second indicator for indicating whether the carriers are adjacent carriers; and
   a third indicator for indicating whether aggregation of the carriers is processed by a single radio frequency process or a single frequency processing unit,
   wherein the determined combination of the first indicator, the second indicator, and the third indicator is reported to the service network, along with the maximum number of supported carriers and the capability category information, by the capability information message.

14. A method for mobile capability signaling by a mobile communication device, comprising:
   receiving a capability enquiry message from the service network;
   determining a maximum number of carriers supported by the mobile communication device and capability category information for the carriers in response to the capability enquiry message, wherein each of the carriers has the same capability, and the capability category information comprises a single capability category for all of the carriers; and
   reporting the maximum number of supported carriers and the capability category information to the service network by at least a capability information message.

15. The method of claim 14, wherein the capability category indicates downlink and uplink data rates, Hybrid Automatic Repeat reQuest (HARQ) processing capability, and multi-antenna capability for all of the carriers supported by the mobile communication device.

16. The method of claim 14, further comprising determining any combination of the following in response to the capability enquiry message:
   a first indicator for indicating whether the carriers are in the same frequency band;
   a second indicator for indicating whether the carriers are adjacent carriers; and
   a third indicator for indicating whether aggregation of the carriers is processed by a single radio frequency process or a single frequency processing unit,
   wherein the determined combination of the first indicator, the second indicator, and the third indicator is reported to the service network, along with the maximum number of supported carriers and the capability category information, by the capability information message.

17. A mobile communication device, comprising:
   a wireless module performing wireless transmissions and receptions to and from a service network; and
   a controller module receiving a capability enquiry message from the service network via the wireless module, determining a maximum number of carriers supported by the mobile communication device and capability category information for the carriers in response to the capability enquiry message, and reporting, via the wireless module, the maximum number of supported carriers and the capability category information to the service network by at least a capability information message,
   wherein each of the carriers has a respective capability, and the capability category information comprises a plurality of capability categories respectively corresponding to the carriers.

18. The mobile communication device of claim 17, wherein each of the capability categories indicates downlink and uplink data rates, Hybrid Automatic Repeat reQuest (HARQ) processing capability, and multi-antenna capability for a respective carrier supported by the wireless module.

19. The mobile communication device of claim 17, wherein the controller module further determines any combination of the following in response to the capability enquiry message:
- a first indicator for indicating whether the carriers are in the same frequency band;
- a second indicator for indicating whether the carriers are adjacent carriers; and
- a third indicator for indicating whether aggregation of the carriers is processed by a single radio frequency process or a single frequency processing unit,
- wherein the determined combination of the first indicator, the second indicator, and the third indicator is reported to the service network, along with the maximum number of supported carriers and the capability category information, by the capability information message.

20. A method for mobile capability signaling by a mobile communication device, comprising:
- receiving a capability enquiry message from the service network;
- determining a maximum number of carriers supported by the mobile communication device and capability category information for the carriers in response to the capability enquiry message, wherein each of the carriers has a respective capability, and the capability category information comprises a plurality of capability categories respectively corresponding to the carriers; and
- reporting the maximum number of supported carriers and the capability category information to the service network by at least a capability information message.

21. The method of claim 20, wherein each of the capability categories indicates downlink and uplink data rates, Hybrid Automatic Repeat reQuest (HARQ) processing capability, and multi-antenna capability for a respective carrier supported by the mobile communication device.

22. The method of claim 20, further comprising determining any combination of the following in response to the capability enquiry message:
- a first indicator for indicating whether the carriers are in the same frequency band;
- a second indicator for indicating whether the carriers are adjacent carriers; and
- a third indicator for indicating whether aggregation of the carriers is processed by a single radio frequency process or a single frequency processing unit,
- wherein the determined combination of the first indicator, the second indicator, and the third indicator is reported to the service network, along with the maximum number of supported carriers and the capability category information, by the capability information message.

* * * * *